Dec. 2, 1969 TE NING CHIN 3,482,191

MAGNETOSTRICTIVE DELAY LINE HAVING A FLAT THIN SHEET OF MAGNETOSTRICTIVE MATERIAL

Filed Sept. 30, 1966

Inventor:
TE NING CHIN

Donald N. Timbie
Attorney

United States Patent Office 3,482,191
Patented Dec. 2, 1969

3,482,191

MAGNETOSTRICTIVE DELAY LINE HAVING A FLAT, THIN SHEET OF MAGNETOSTRICTIVE MATERIAL

Te Ning Chin, Princeton, N.J., assignor to RCA Corporation, a corporation of Delaware Filed Sept. 30, 1966, Ser. No. 583,202
Int. Cl. H03h *9/30*
U.S. Cl. 333—30 4 Claims

ABSTRACT OF THE DISCLOSURE

A magnetostrictive delay line having a flat, thin sheet of magnetostrictive material dimensioned to accentuate the amount of strain energy in the principal mode of translation of the strain energy induced by a launching coil.

This invention relates to improvements in the structure of magnetostrictive delay lines.

Devices of this type have utilized one or more wires of magnetostrictive material, and in general they operate as follows. A pulse of current is passed through a launching coil of an input transducer that surrounds the magnetostrictive wire or wires of the delay line. This causes a wave of strain energy to be propagated in both directions from the launching coil along the wires. Output pulses of voltage are produced as the strain wave passes through pickup coils of the output transducers that are wound around the wires. The time delay between the input pulse and an output pulse is, of course, dependent on the distance of a particular pickup coil from the launching coil. Reflections from the ends of the line, which might interfere with its operation, are minimized by provision of proper mechanical terminations that absorb and damp the strain waves.

Whereas delay lines using magnetostrictive wires may be useful for some applications, it has been found that the width or duration of the output pulses is too great for others. For example, if it is desired to utilize the output pulses to control light emission at a number of points along each line of a television raster, the resolution of the resulting image is dependent on the number of discrete pulses occurring along the line. It has been found that the pulses produced by delay lines of the type described have a duration of about 0.3 of a microsecond when the output pulses have an amplitude of about 10 millivolts which, in a system utilizing U.S. television standards, produces a poor resolution of about 177 lines. Because the shape of an output pulse gradually gets narrower as the peak amplitude is approached, it is possible to space the pickup coils closer together so that there is an overlap at the base of the pulses, and utilize clipping circuits that pass only that portion of the pulses which is above the region of overlap. However, such pulses would be of relatively small amplitude, and this approach wastes that portion of them that is in the region of overlap. In practical devices, this would waste approximately half of the pulse voltage.

Accordingly, it is an object of this invention to provide a magnetostrictive delay line that produces narrower output pulses having a much greater amplitude than known magnetostrictive delay lines.

The voltage amplitude of the output pulses of the magnetostrictive wire type of delay line increases with the number of turns in the pickup coils surrounding the magnetostrictive wire, but the resulting alternating current impedance of the coils is often higher than is desirable. For example, the impedance can be too high to permit satisfactory direct coupling of the coils to low impedance devices such as junction transistors.

According, it is a further object of this invention to provide a magnetostrictive delay line that produces output pulses of larger voltage at a relatively low alternating current impedance.

It has been found with magnetostrictive wire type delay lines that the additional increase in output voltage gets less as more turns are used in the pickup coils, a characteristic which results from the fact that the magnetic coupling between the added outer turns and the delay line decreases. This in effect limits the maximum output voltage that can be produced by practicable structures.

Accordingly, it is another object of this invention to provide a delay line in which a greater output voltage is provided by the pickup coils than known types of magnetostrictive delay lines.

Magnetostrictive wire type delay lines having a plurality of output transducers have been rather expensive to fabricate and assemble, and it is accordingly, another object of this invention to provide a magnetostrictive delay line which is less expensive to fabricate and assemble.

The manner in which these objectives can be realized in accordance with the principles of this invention will be understood after consideration of the description given below in conjunction with the various figures of the drawing, but it may be briefly explained as follows. Instead of using magnetostrictive wire or plurality of magnetostrictive wires delay line is formed in accordance with this invention, using a flat thin sheet of magnetostrictive material. Both the launching coil and the pickup coils may be formed from a single turn of wire encircling the magnetostrictive sheet. The wires may be positioned in parallel grooves in the adjacent surfaces of magnetically permeable plates or housings that are mounted on opposite sides of the flat magnetostrictive sheet.

Reference is now made to the drawings in which.

Figure 1:
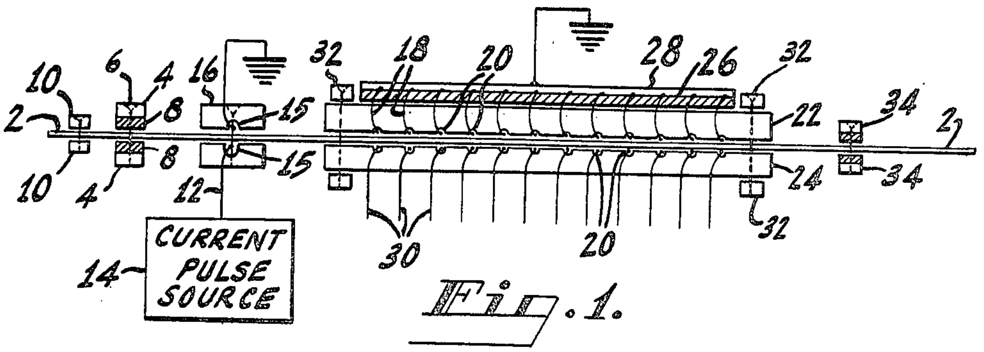
FIGURE 1 is a side view of the magnetostrictive delay lines of this invention.
Figure 2:
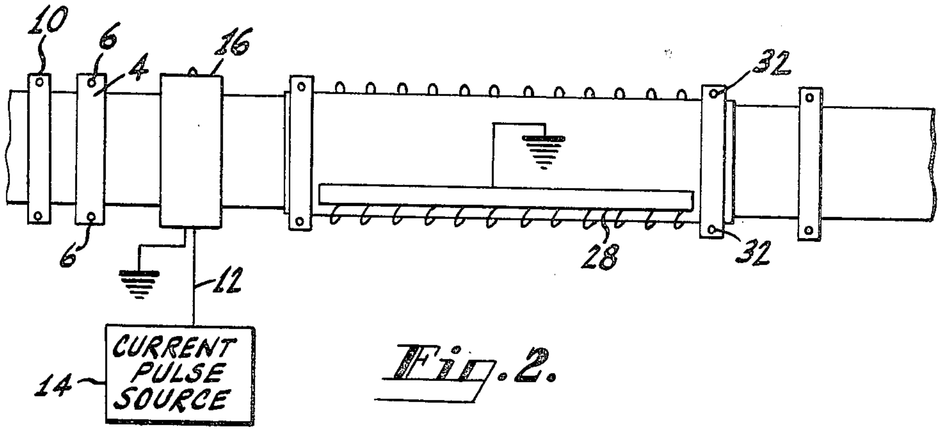
FIGURE 2 is a top view.

In FIGURES 1 and 2 a sheet of magnetostrictive material 2, is clamped near one end between damping bars 4, which extend across the sheet on either side. The inner surfaces of the bars 4, i.e. those adjacent the sheet 2, are lined with rubber 8 or some other suitable resilient substance, and the pressure on the sheet is adjusted by screws 6, so as to damp out the magnetostrictive waves and thus minimize any reflections that might otherwise occur. If necessary, other damping bars 10 may be used so as to further reduce reflections.

In order to initiate a strain wave in the sheet 2, an insulated wire 12 is connected to a suitable source 14 of current pulses at one end and to ground at the other. The wire 12 lies in grooves 15 in a plate or a housing 16 of low reluctance material, such as ferrite, and hence forms essentially one loop around the sheet 2 and can be termed a launching coil.

Output pulses are produced when the strain wave passes through successive pickup loops or coils 18 of insulated wire that surround the sheet 2 at predetermined points along its length. In order to provide maximum flux linkage, the loops 18 are positioned in parallel grooves 20 in upper and lower plates or housings 22 and 24, which are made of low magnetic reluctance material, such as mu metal.

Various circuit connections can be made, but in this particular example the upper ends of the loops 18 are inserted between a strip of insulation 26 and a conductive grounding bar 28, the latter being connected to ground so as to establish the upper end of all the loops 18 at ground potential. The lower ends 30, of the loops 18, can be individually connected to a device or devices to be operated by the pulses.

In order to provide output pulses of maximum amplitude, the space between the magnetostrictive sheet 2 and the plates 22 and 24 should be reduced to a minimum. The sheet 2 is clamped between the plates 22 and 24 by a suitable number of bolts 32.

Strain waves reflected from the end of the magnetostrictive sheet 2 are attenuated by clamping the output end of the sheet 2 between a set of damping bars 34 that are similar in construction to the damping bars 4.

Figure 3:
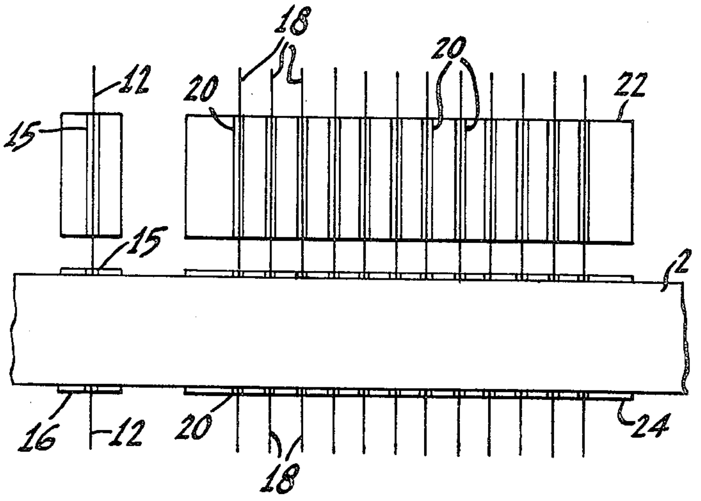
FIGURE 3 illustrates the relative position of certain parts at one point in the assembly.

The ease with which a device having a great number of pickup coils can be assembled is illustrative in FIGURE 3. The upper and lower plates or housings 22 and 24 are positioned side by side with the grooves 20 in each aligned. The insulated wires 18 are placed in the grooves, and they may be retained in their respective grooves by suitable adhesive or by a press fit between the wire and the groove. The magnetostrictive sheet 2 is placed on top of the wires in one of the plates, here shown as the plate 24, and the other plate is merely folded over, like the cover of a book, on top of the sheet 2, care being given to keeping the corresponding grooves in each of the plates 22, 24 parallel and adjacent. The assembly of the launching transducer 12, 15, 16 can be achieved in the same manner.

Whereas the device of this invention may have various parameters depending on the application, a particular form will now be described. In one embodiment, the plates 22, 24 are 4 inches wide and 12 inches long and approximately ¼ inch thick. Five hundred parallel transverse grooves are cut into a face of each plate. The grooves are about 5 mils wide, 6 mils deep and 22 mils center to center. Number 36 Formex wire is embedded in the grooves. The sheet 2 is comprised of supermendur (2% v, 49% Co, 49% Fe) of 0.001 inch thickness. Its width was 3.75 inches and its length between termination was 16 inches. The housing 16 for the launching coil 15 was made of ferrite and had grooves formed therein for accommodating the launching coil 12. With a pulse of current of a little more than 2 amperes and a duration of $10^{-7}$ seconds applied to the launching coil 12, discrete output pulses of the same duration and of an amplitude greater than 100 millivolts were obtained from the pickup coils. In television applications this would provide the potential of obtaining over 500 lines of resolution.

The strain energy induced in the sheet 2 of magnetostrictive material by the launching coil 12 is translated along the sheet in a number of modes, each producing its own strain wave. The first strain wave moving away from the launching coil is associated with the principal mode, and it is followed by spaced strain waves of decreasing amplitudes associated, respectively, with minor modes. By suitable dimensioning of the sheet 2, the amount of strain energy in the principal mode can be increased with respect to that contained in the other modes so that the amplitude of the output voltage pulses produced in the pickup coils 18 by the main strain wave greatly exceeds the amplitude of the largest of the voltage pulses produced in these coils by the following strain waves. In the physical embodiment described, the ratio was approximately 10-to-1.

In choosing the dimensions of the sheet 2, the thickness is primarily determined by the width of the output pulses that is required; the thinner the sheet the shorter are the pulses. The relative amounts of strain energy in the various modes of translation is determined by the relationship between the width of the strip 2 and its length. In general, as the width is increased in proportion to the length, more strain energy is transmitted by the principal mode, with the result that the output voltage pulses associated with this mode are relatively greater than the output voltage pulses associated with the minor modes. As the sheet 2 is made wider in order to reduce the relative energy in the minor modes, the absolute amplitude of any output voltage pulses is increased in direct proportion. Thus the wider the magnetostrictive sheet, the greater are the output voltage pulses produced in response to the principal mode and the greater is the relative amplitude of these pulses to the output voltage pulses produced by the minor modes.

What is claimed is:

1. A delay line for producing a number of pulses at predetermined intervals following an input pulse comprising in combination a thin sheet of magnetostrictive material, the thickness of said sheet being much less than the width, a launching coil comprised of at least one wire extending across one side of said sheet and adjacent thereto in a direction generally transverse to its length and back on the opposite side of said sheet and adjacent thereto in a path in the same plane perpendicular to the sheet as the portion of the wire adjacent said one side, a housing of low magnetic reluctance material mounted adjacent the wires and said sheet on both sides thereof, a plurality of pickup coils each having at least one wire extending across one side of said sheet and adjacent thereto and back across the opposite side of said sheet and adjacent thereto in a path in the same plane perpendicular to the sheet as the portion of the wire adjacent said one side, each of said pickup coils being parallel to said launching coil and spaced therefrom along the length of said sheet by a different predetermined distance, and a housing of low magnetic reluctance material mounted adjacent said pickup coils and said sheet on both sides thereof.

2. A delay line as set forth in claim 1 wherein said launching coil and said pickup coils are mounted in grooves of such depth within their respective housings that the surfaces thereof adjacent to the sheet can make substantially continuous contact with said sheet.

3. A delay line as set forth in claim 1 wherein said thin sheet of magnetostrictive material is planar.

4. A delay line comprising in combination a thin sheet of magnetostrictive material, means adjacent one end of said sheet for causing a strain wave to be propagated along a given direction in said sheet therein, a member of low magnetic reluctance adjacent at least one surface of said sheet of magnetostrictive material, said member having a plurality of grooves extending substantially transversely to the direction of propagation of said strain wave in said sheet, and conductor means located in said grooves whereby a strain wave introduced into said sheet of magnetostrictive material causes voltage pulses to be generated successively in said conductor means as said strain wave propagates along said sheet.

References Cited

UNITED STATES PATENTS 2,526,229 10/1950 Hazeltine.
3,129,412 4/1964 Lovell.

HERMAN KARL SAALBACH, Primary Examiner
TIM VEZEAU, Assistant Examiner

U.S. Cl. X.R.

333—71